Sept. 25, 1956 G. R. HETTICK 2,764,522
HYDROCARBON EXTRACTION UNIT AND OPERATION
Filed Dec. 29, 1952
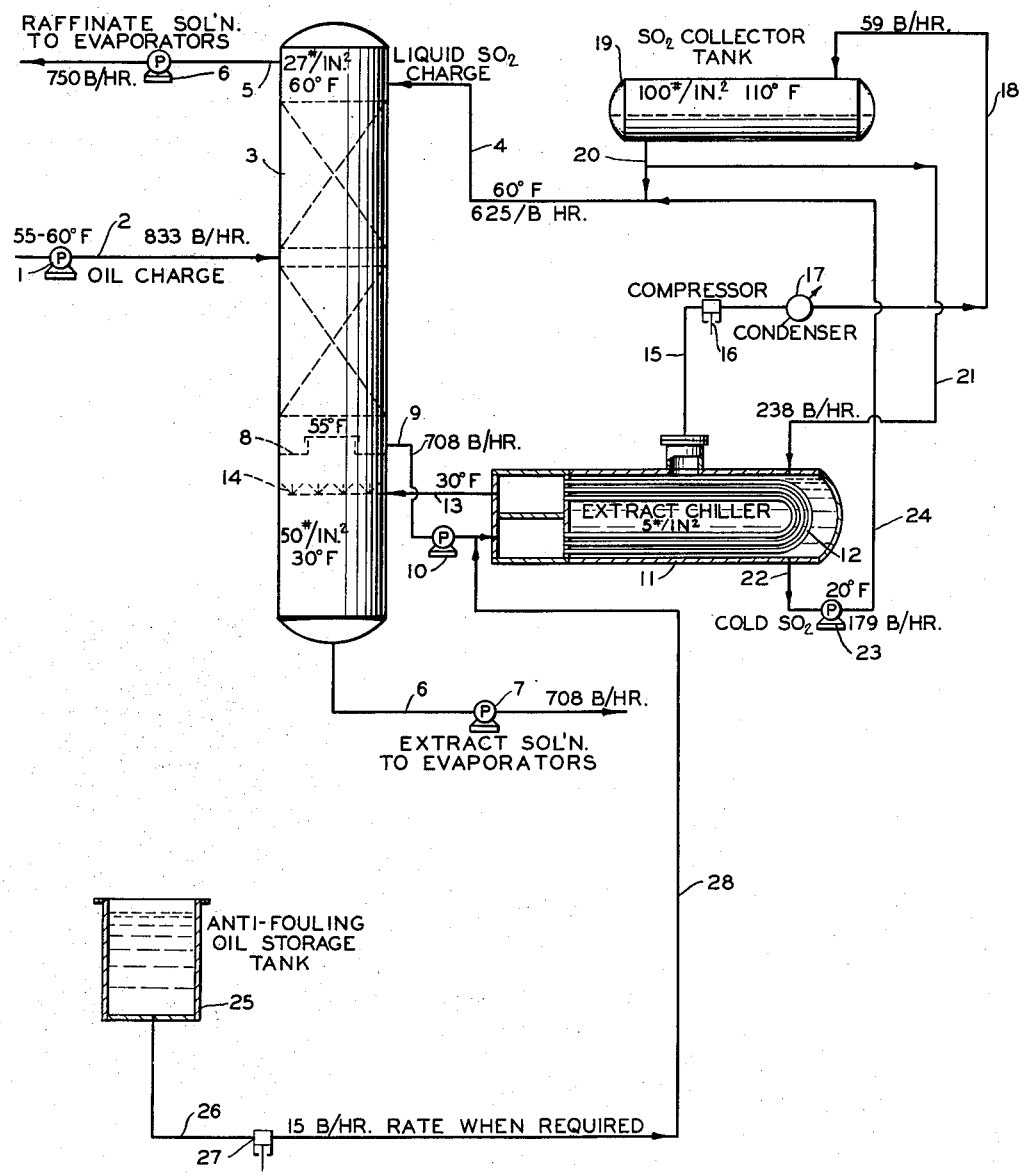
INVENTOR.
G.R. HETTICK
BY
Hudson + Young
ATTORNEYS

United States Patent Office 2,764,522
Patented Sept. 25, 1956

2,764,522

HYDROCARBON EXTRACTION UNIT AND OPERATION

George R. Hettick, Borger, Tex., assignor to Phillips Petroleum Company, a corporation of Delaware Application December 29, 1952, Serial No. 328,373

14 Claims. (Cl. 196—14.26)

This invention relates to the design and operation of a hydrocarbon extraction unit. In one of its aspects the invention relates to a method and apparatus in which certain constituents of a hydrocarbon oil can be separated from certain other constituents of said oil employing a selective solvent, for example, sulfur dioxide. In another aspect of the invention it relates to the design and operation of an extraction unit in which aromatic constituents can be removed from waxy hydrocarbon oils containing the same, for example, oils formed in catalytic and/or thermal cracking units. In still another of its aspects, the invention relates to provision of means and method whereby certain fouling of equipment due to wax deposition in an extraction unit as described can be avoided. In a still further aspect the invention relates to the avoidance of waxy deposits within or upon cooling or other surfaces of chiller means incorporated in said extraction unit for the purpose of chilling the extract produced therein.

The use of a liquid sulfur dioxide extraction for the removal of aromatic constituents from waxy oils containing aromatics, such as cycle oils from catalytic or thermal cracking units, is now practiced in the petroleum industry. These units may be used for several purposes, such as improving the quality of catalytic cracking unit feed stocks, or for production of concentrated aromatic fractions as a raw material for production of chemicals.

The operation of a liquid sulfur dioxide extraction unit is illustrated, schematically, in the drawing. Oil charge, which can be a cycle oil from a cracking operation, as described, is pumped by pump 1 through conduit 2 into sulfur dioxide extraction column 3. In column 3, the cycle oil, which has been introduced at a locus intermediate the ends of the column, is admixed with liquid sulfur dioxide charged to an upper portion of the column by conduit 4, forming a raffinate phase and an extract phase. In the column, the raffinate phase, consisting essentially of sulfur dioxide and non-aromatic constituents of the cycle oil, travels upwardly. This raffinate phase is removed from tower 3 by way of conduit 5 and pump 6. Upon removal from column 3, the raffinate solution is treated by means not shown, suitably an evaporator means, to recover therefrom whatever sulfur dioxide is contained therein following which the raffinate oil can be passed to a catalytic or other hydrocarbon conversion operation. In the column, the extract phase containing sulfur dioxide and aromatic constituents of the cycle oil travels downwardly and is ultimately withdrawn from column 3 through conduit 6 and pump 7 and passed to treating means not shown, suitably an evaporator system, for recovery of sulfur dioxide and an aromatic constituent or product. Provided at a lower portion of column 3 is a capped draw-off tray 8 from which there is withdrawn through conduit 9 and pump 10 at least a portion of the extract phase formed in the tower, which extract phase is passed into extract chiller 11 through which it is conducted by means of tubes 12 contained in said chiller. Tubes 12 are surrounded by cold liquid sulfur dioxide which serves, by heat transferred through said tubes, to chill the extract within the said tubes. The extract thus chilled is returned to column 3 by way of conduit 13 and spray arrangement 14 located at a point positioned below draw-off or trap-out tray 8 but sufficiently above the bottom of column 3 to permit proper conditions of equilibrium to be maintained at said bottom. Sulfur dioxide vapor is taken off extract chiller 11 by conduit 15, compressor 16 and condenser 17 and passed by conduit 18 to sulfur dioxide collector tank 19. From tank 19, sulfur dioxide is passed by way of conduits 20 and 21 to extract chiller 11 for reuse. Also liquid sulfur dioxide is passed from sulfur dioxide collector tank 19 by way of conduits 20' and 4 into the top of column 3 for use as described. Still further, cold sulfur dioxide is taken from the liquid phase in extract chiller 11 and passed by way of conduit 22, pump 23, and conduits 24 and 4 to the top of column 3 for use as described.

In the operation of a unit as described, difficulty has been encountered due to wax deposition within the tubes of the extract chiller. Clearly, the function of tower 3 is to cause a countercurrent fractionation of the hydrocarbon oil feed by virtue of differences in the solubility of the various constituents of the oil in the solvent. To improve the selectivity and efficiency of separation in such a column it is desirable, as is well known in the art, to maintain a temperature differential between the top and bottom of the tower, and therefore the cooling accomplished in extract chiller 11 is an essential integral step in the operation. This step must be accomplished effectively at all times and any interference therewith interferes with the entire operation. Thus, it is seen that the wax deposition, referred to above, which occurs in the extraction chiller tubes is a real operating difficulty. It is with this operating difficulty that the present invention is primarily concerned.

According to this invention, I have found that by introducing certain oils, described herein, into the warm extract phase passing to the chiller tubes 12, the fouling of the said tubes due to wax deposition can be avoided. Thus, I have found a simple, yet completely effective, procedure for the elimination or prevention of the waxing or fouling condition which has been described.

According to this invention, therefore, there is introduced into the extraction phase passed into chiller tubes 12, an anti-fouling oil which, in the drawing, is taken from anti-fouling oil storage tank 25 by way of conduit 26, pump 27, and conduit 28, joining the extract being pumped by pump 10 into chiller tubes 12 at a point just before the extract is subjected to the effect of chiller 11. The anti-fouling oil is added in an amount effective to prevent any substantial deposition of wax within the chiller zone and will be generally less than 15 weight percent of the extract oil yield, preferably not more than about 10 weight per cent. In the operation in the drawing which depicts a preferred operation, no external oil other than the anti-fouling oil, is added to the extract phase during its formation or afterwards.

Thus, according to this invention, there are provided a design and operation for a solvent extraction unit, for example, a liquid sulfur dioxide-hydrocarbon oil extraction unit which comprises introducing into the solvent-extract phase before it is chilled in a chiller comprising chiller tubes, or equivalent, an anti-fouling oil having characteristics such that the deposition of solid constituents from the extract phase being chilled is prevented. For example, in extracting a cycle oil charge, as described, with liquid sulfur dioxide, the anti-fouling oil can be any hydrocarbon oil having a wax cloud point below the temperature to which the extract is chilled in the chiller.

Preferably, such an oil, according to this invention, will be more paraffinic or more saturated than the extract phase oil and will have a boiling range above about 200° F. For example, the said oil can be a straight run distillate product having a boiling range of from about 450° F. to about 550° F. It is presently preferred that the initial boiling point of the said oil be sufficiently high so that it will not interfere with the clean separation of the solvent, for example, sulfur dioxide, from the extract or raffinate phase. Further for presently preferred operation, the wax cloud point of the antifouling oil should be well below the chilling temperature, for example, at least about 20° F. below the said temperature.

As an example of operation, the charge which is a cycle oil, as defined herein and which can have a boiling range of approximately 325–750° F., is pumped by pump 1 into tower 3, will have a temperature of about 55 to 60° F., and the tower bottom will have a temperature of about 30° F. To maintain the tower bottom temperature, the oil leaving chiller 11 by way of conduit 13 will have a temperature not over 30° F. and preferably a temperature somewhat lower than 30° F. Directly the temperature of the oil charged to chiller 11 is lowered by even 1° F., a small amount of wax is precipitated from the extract phase solution and wax is deposited in the chiller tubes 12. It is this wax deposit which can be avoided and in some cases reduced by operation according to the invention, that is, by injection continuously, or from time to time, of a desirable proportion of anti-fouling oil.

It is possible to control the tower bottom temperature within specified limits, for example, in the range 25 to 35° F., and when sufficient anti-fouling oil has been added to arrive at a lower temperature in said range, to discontinue the addition of said oil for periods of time extending up to 2 or 3 days, during which time the temperature at the tower bottom will increase to a temperature at the higher end of the said range. At this time, the efficiency of separation of aromatics and paraffinic constituents of the cycle oil will be at a minimum desirable point, whereupon the use of the anti-fouling oil can again be begun and continued until the temperature at the tower bottom has again been lowered to 25° F. or thereabouts. As noted, continuous injection of the anti-fouling oil can be practiced according to the invention.

Although the anti-fouling oils have been described as being more paraffinic in nature than the extract phase, it is clear that the said oils can be any desirable oils which will not affect the quality of the extract when it is to be an important product of the process or which, should these oils be ultimately in the catalytic cracking feed stock obtained from the raffinate phase, will not affect the catalytic cracking operation. Preferably and obviously so, the selection of the anti-fouling oil will be so made that neither the raffinate oil or the extract phase oil will be contaminated. Oils suitable and which have been employed in actual practice are absorption oils, for example, boiling in the range 445 to 570° F. and having a gravity °API of about 39.2, polymers produced from kerosene treating, polymers produced from rerun of various clay tower pressure distillate treating operations, diesel fuels, selected fractions of heavy alkylates, etc.

The following table summarizes solvent extraction unit operation according to the invention as applied to an operating plant by injection of anti-fouling oils on the days indicated. Thus, it will be noted in the table that the tower bottom temperature was reduced from an initial 51° F. to a temperature of 48° F. on the second day and 44° F. on the seventh day. Thus, before the absorption oil injection, considering the temperature differential across the chiller tube bundle, it was 15° F., whereas after injection it was 8° or lower. It is noted that substitution of clay tower polymer, obtained upon treatment of kerosene to remove sulfur compounds, as above described and boiling in the range of 448 to 587° F. and having an API gravity of 39.5°, maintained the low temperature differential of 6° as indicated on the 15th day of operation. The injection of the anti-fouling oil has been carried out both continuously and by intermittent addition.

It should be noted that according to this invention, not only can the deposition of wax be prevented but that wax already deposited can be removed from the chiller tube bundle when an anti-fouling oil, according to the invention, is employed.

*Table 1*

TABULATION OF OPERATING CONDITIONS BEFORE AND AFTER ANTI-FOULING OIL INJECTION TO SOLVENT EXTRACTION UNIT EXTRACT PHASE

|  | 1st Day Without Absorption Oil Injection | 2nd Day Using Absorption Oil Injection | 7th Day Typical Conditions for Absorption Oil Injection | 15th Day Typical Conditions for Polymer Injection |
|---|---|---|---|---|
| Oil Charge Rate, B./H | 600 | 600 | 900 | 900 |
| SO₂ Charge Rate, B./H | 600 | 600 | 630 | 638 |
| Extr. Circ. Rate to Chiller, B./H | 416 | 416 | 400 | 428 |
| Raffinate Yield, B./H | 350 | 380 | 695 | 640 |
| L. V. Percent¹ of Charge | 58.3 | 63.3 | 77.2 | 71.1 |
| Extract Yield, B./H | 250 | 235 | 225 | 285 |
| L. V. Percent¹ of Charge | 41.7 | 39.2 | 25.0 | 31.7 |
| Anti-fouling Oil Charge Rate, B./H | 0 | 15 | 20 | 25 |
| Tower Temperature: |  |  |  |  |
| Top, °F | 57 | 56 | 55 | 55 |
| Bottom, °F | 51 | 48 | 44 | 44 |
| Donut Draw, °F | 54 | 53 | 52 | 50 |
| Ext. Sol. Return from Chiller, °F | 48 | 43 | 37 | 39 |
| Chiller SO₂, °F | 33 | 35 | 31 | 33 |
| Temperature Differential Across Chiller Tube Bundle | 15 | 8 | 6 | 6 |
| Compressor Suction Pressure, p. s. i. a. | 18.6 | 18.6 | 18.8 | 19.0 |
| SO₂ Charge, °F | 60 | 59 | 57 | 58 |
| Oil Charge, °F | 66 | 65 | 66 | 63 |

¹ Liquid volume percent.

Both the absorption oil and the polymer oil used as anti-fouling oils were more paraffinic than the extract oil produced in the respective extractive operations.

The following are examples of charge stocks which have been treated in an extraction unit operating with sulfur dioxide as the solvent and which were employed in the tests summarized in Table I, above.

Table II
CHARGE STOCK TO SULFUR DIOXIDE EXTRACTION UNIT DURING ANTI-FOULING OIL TESTS

| Charge to Solvent Extraction Unit | 1st Day | | 2nd Day | | 7th Day | | 15th Day | |
| --- | --- | --- | --- | --- | --- | --- | --- | --- |
| L. V. percent [3] Heavy Cycle Oil from Fixed Bed Catalytic Cracking Unit. | 9 | | 14 | | 24 | | 14. | |
| L. V. Percent [3] Total Cycle Oil from Fluidized Bed Catalytic Cracking Unit. | 91 {62.4% LCO [1] / 37.6% HCO [2]} | | 86 {64.6% LCO [1] / 35.4% HCO [2]} | | 76 {38.4% LCO [1] / 61.6% HCO [2]} | | 86 {51.2% LCO [1] / 48.8% HCO [2]} | |
| Boiling Range, °F. (Combined Charge to Unit from Charge Tank): | | | | | | | | |
| IBP [4] | 330 | | | | 390 | | 385. | |
| EP [5] | 717 | | | | 745 | | 741. | |
| Boiling Range, °F. (Fluidized Bed Catalytic Cracking Unit LCO [1] and HCO [2] Being Yielded to Charge Tank): | LCO [1] | HCO [2] | LCO [1] | HCO [2] | LCO [1] | HCO [2] | LCO [1] | HCO [2] |
| IBP [4] | 325 | 344 | 416 | 487 | 352 | 457 | 398 | 352 |
| EP [5] | 630 | 759 | 628 | | 640 | | 628 | |
| Boiling Range, °F. (Fixed Bed Catalytic Cracking Unit) (HCO) [2]: | | | | | | | | |
| IBP [4] | 439 | | | | | | | |
| EP [5] | 716 | | | | | | | |

[1] LCO—light cycle oil.
[2] HCO—heavy cycle oil.
[3] L. V. Percent—liquid volume percent.
[4] IBP—initial boiling point.
[5] EP—end point.

A particular advantage of this invention resides in the possibility to lower the bottom temperature of the extraction tower to the level necessary for the desired minimum extract production, thus increasing the yield of raffinate and at the same time yielding an extract more aromatic in character than would otherwise be obtained. Aromatics thus obtained are valuable as carbon black feed stocks or for blending in the preparation of carbon black feed stocks.

While this invention has been described with respect to the use of sulfur dioxide as the extraction or selective solvent, it is clear that other solvents can be employed. One skilled in the art can determine the suitability of any particular solvent by mere routine test. Thus suitable polar selective solvents such as furfural, etc., can be employed according to this invention. Therefore, this invention is not limited to any particular solvent but rather resides in the concept that an anti-fouling oil shall be injected to remove solids deposited, for example wax, in the chiller tube bundle or equivalent apparatus which is employed to maintain a desired temperature differential between the extraction tower top and its bottom.

Reasonable variation and modification are possible within the scope of the foregoing disclosure, drawing and the appended claims to the invention, the essence of which is that fouling of a chiller adapted to chill the extract phase in a solvent extraction tower in which an oil is being solvent-extracted, the said oil depositing solid constituents upon cooling, can be prevented (or solid constituents already deposited removed) by injection of an anti-fouling oil continuously or intermittently, substantially as set forth and described herein. For example, the chilling of the extract phase can be effected within the tower described by indirect heat exchange therein.

I claim:

1. In the operation of a selective solvent extraction system, in which an oil to be extracted is fed to an intermediate portion of a solvent extraction zone; a selective solvent is fed to one end of said zone; a raffinate phase and an extract phase are removed from the ends, respectively, of said zone; a temperature differential is maintained between said ends of said zone, by lowering the temperature of said extract phase in said zone, causing deposition of solids and thus causing fouling of surfaces in the zone of the operation in which the temperature is lowered; the improvement which comprises introducing into admixture with said extract phase, before its temperature is lowered, an anti-fouling oil more paraffinic than the extract phase oil and which is adapted to prevent fouling of the said surfaces in the zone in which the temperature is lowered and then lowering the temperature of said admixture.

2. An operation according to claim 1 in which the zone in which the temperature of the extract phase is lowered is separate from the solvent extraction zone.

3. In the operation of a selective solvent extraction in which an oil containing selectively extractable aromatic constituents is fed to an intermediate portion of a solvent extraction zone; at least one selective solvent selected from the group conissting of sulfur dioxide and furfural is fed to an upper portion of said zone; a raffinate is removed at an upper portion of said zone; an aromatic extract phase is removed from a lower portion of said zone; a temperature differential is maintained between said upper and lower portions of said zone, by chilling the extract phase in the lower portion of said zone, causing a solid hydrocarbon deposit in the zone in which the temperature of said extract phase is reduced; the improvement which comprises introducing to and admixing with the extract before it is chilled an anti-fouling oil more paraffinic than the extract phase oil in an amount effective to prevent the said deposit upon chilling of said extract phase.

4. An operation according to claim 3 in which the extract phase in the lower portion of said zone is chilled by removing a portion thereof and passing the same through a separate chilling zone and then returning the thusly chilled portion of extract phase to the lower portion of said extraction zone and wherein the said anti-fouling oil is introduced into and admixed with the said portion of extract phase before it is passed to said chilling zone.

5. In the operaton of a chiller zone in which an aromatic oil containng wax is chilled, which oil upon chilling deposits wax causing lowered heat transfer in said zone, said oil comprising extract phase from a solvent extraction zone, the improvement which comprises introducing and admixing with said oil before it is chilled in said zone an anti-fouling oil more paraffinic than said aromatic oil and chilling said admixture in said chiller zone.

6. An operation according to claim 5 in which the aromatic oil which is chilled is comprised in an extract phase obtained from a solvent extraction zone in which the said extract phase is derived from an oil by treatment with a selective solvent which is lower boiling than said oil and wherein the said anti-fouling oil has a boiling range above that of the selective solvent in order to permit ready separation of the selective solvent from phases obtained in said solvent extraction zone.

7. An operation according to claim 6 in which the selective solvent is selected from the group consisting of sulfur dioxide and furfural, the oil treated in the solvent extraction zone is a cycle oil boiling in the approximate range of 325–750° F. and the anti-fouling oil is at least one selected from the group consisting of a straight-run distillate, absorption oils, polymers produced from kerosene-treating, polymers produced by re-run of clay tower pressure distillate, diesel fuels, and selected fractions of heavy alkylates.

8. The recovery of an aromatic-rich phase oil from an oil comprising aromatic constituents and constituents more saturated than said aromatic constituents which comprises feeding said oil to an intermediate portion of a selective solvent extraction zone; therein contacting said oil with liquid sulfur dioxide solvent, thus producing a raffinate phase rich in said constituents more saturated than said aromatic constituents and an extract phase rich in aromatic constituents, the said raffinate phase being recovered and removed from said zone as an upper phase and said extract phase being recovered and removed from said zone as a lower phase; maintaining a temperature differential between the upper and lower portions of said zone by chilling at least a portion of the extract phase in the lower portion of said zone while avoiding the deposit of waxy material from said extract phase while it is being chilled by admixing with said extract phase before it is chilled an anti-fouling oil more paraffinic than said aromatic constituents of said extract phase and chilling said admixture of extract phase and anti-fouling oil.

9. A process in which a cycle oil obtained from a catalytic cracking of hydrocarbon oil is treated to recover aromatics therefrom which comprises passing said oil at a temperature in the approximate range of 55–60° F. into an intermediate portion of a solvent extraction zone; in said zone contacting said oil with liquid sulfur dioxide at a temperature of approximately 60° F. to produce an upper raffinate phase rich in paraffinic constituents and a lower extract phase rich in said aromatics; removing at least a portion of said extract phase from said solvent extraction zone; admixing with said removed portion of extract phase, immediately before chilling, an anti-fouling oil which is more paraffinic than the aromatic constituents contained therein; chilling the admixture of extract phase and anti-fouling oil thus obtained to a temperature of approximately 30° F. in a proportion effective to maintain an extraction zone bottom temperature of approximately 30° F.; returning said chilled admixture to the lower portion of said solvent extraction zone; and recovering said raffinate phase and said extract phase as products of the process.

10. In the operation of a chiller zone employed in connection with a solvent extraction zone and in which chiller zone an aromatic oil containing wax is chilled, which oil upon chilling deposits wax causing lowered heat transfer in said chiller zone, said oil comprising extract phase from said extraction zone, the improvement which comprises introducing and admixing with said oil before it is chilled in said zone an anti-fouling oil more paraffinic than said aromatic oil, the said anti-fouling oil being the sole external oil added to the extract phase during and after its formation and chilling said admixture in said chiller zone.

11. In combination in a selective solvent extraction system a selective solvent extraction vessel; a conduit in communication with an intermediate portion of said vessel for feeding an oil to be treated thereinto; a conduit at an upper end of said vessel for removing raffinate therefrom; a conduit at the bottom of said vessel for removing extract therefrom; a conduit at the upper portion of said vessel for introducing selective solvent thereinto, the solvent conduit being at a point remote from said conduit for removal of raffinate from said vessel; a draw-off tray intermediate the conduit for introducing oil into said vessel and the bottom thereof, said tray being adapted to collect an extract phase travelling downwardly in said vessel, an extract chiller vessel, a conduit communicating with said draw-off tray and with said extract chiller vessel; a passageway through said extract chiller, communicating with said last mentioned conduit; a conduit communicating with said passageway through said extract chiller and with said vessel at a point below said draw-off tray, for returning chilled extract to said solvent extraction vessel; a pump upon said conduit communicating with said draw-off tray and said passageway in said extract chiller; and a conduit in open communication with said conduit communicating said draw-off tray and said passageway in said extract chiller for introducing an oil into said extract phase before it passes into said extract chiller.

12. In the operation of a selective solvent extraction system in which an oil to be extracted is fed to an intermediate portion of a solvent extraction zone; a selective solvent is fed to one end of said zone; a raffinate phase and an extract phase are removed from the ends, respectively, of said zone; a temperature differential is maintained between said ends of said zone by lowering the temperature of said extract phase in a chiller zone; said extract phase containing a quantity of solvent sufficient to cause precipitation of solids from said extract phase upon the chilling thereof causing fouling of chilling surfaces in said chiller zone; the improvement which comprises introducing into and admixing with said extract phase, before chilling, an anti-fouling oil more paraffinic than the extract phase oil in an amount not over 15 per cent by weight of said extract phase oil, said anti-fouling oil being adapted to prevent fouling of said chilling surfaces and maintaining said admixture, in contact with said chilling surfaces, at least until chilling is accomplished.

13. A process in which a cycle oil obtained from a catalytic cracking of hydrocarbon oil is treated to recover aromatics therefrom which comprises: passing said oil into an intermediate portion of a solvent extraction zone; in said zone contacting said oil with liquid sulfur dioxide under extraction conditions to produce an upper raffinate phase rich in paraffinic constituents and a lower extract phase rich in aromatic constituents; removing at least a portion of said extract phase from said solvent extraction zone; admixing with said removed portion of extract phase, immediately before chilling, an anti-fouling oil which is more paraffinic than the aromatic constituents contained therein; chilling the admixture of extract phase and anti-fouling oil thus obtained; returning said chilled admixture to the lower portion of said solvent extraction zone; and recovering said raffinate phase and said extract phase as products of the process.

14. The process of claim 13 wherein the amount of said anti-fouling oil admixed with said removed portion of extract phase is not over 15 per cent by weight of said oil in said extract phase.

References Cited in the file of this patent

UNITED STATES PATENTS

| | | |
|---|---|---|
| 2,064,422 | Fenske et al. | Dec. 15, 1936 |
| 2,079,885 | Voorhees | May 11, 1937 |
| 2,081,720 | Van Dijck | May 25, 1937 |
| 2,083,511 | Tuttle | June 8, 1937 |
| 2,114,524 | Egli | Apr. 19, 1938 |
| 2,162,963 | McKittrick | June 20, 1939 |
| 2,258,279 | Caselli et al. | Oct. 7, 1941 |
| 2,346,491 | Kiersted | Apr. 11, 19944 |